United States Patent [19]

Yoshino et al.

[11] Patent Number: 5,417,776
[45] Date of Patent: May 23, 1995

[54] HARD AUSTENITIC STAINLESS STEEL SCREW

[75] Inventors: Akira Yoshino, Osakasayama; Masaaki Tahara, Takatsuki; Haruo Senbokuya, Tondabayashi; Kenzo Kitano, Kawachinagano; Teruo Minato, Hashimoto, all of Japan

[73] Assignee: Daidousanso Co., Ltd., Osaka, Japan

[21] Appl. No.: 285,630

[22] Filed: Aug. 4, 1994

Related U.S. Application Data

[63] Continuation of Ser. No. 155,279, Nov. 22, 1993, abandoned, which is a continuation of Ser. No. 731,067, Jul. 17, 1991, abandoned.

[51] Int. Cl.$^6$ ............................................. C23C 8/26
[52] U.S. Cl. .................................... 148/318; 148/230; 148/317; 411/378; 411/902; 411/903; 428/626; 428/655
[58] Field of Search ............... 148/230, 316, 317, 318; 428/615, 626, 655; 411/378, 902, 903

[56] References Cited

U.S. PATENT DOCUMENTS

| | | | |
|---|---|---|---|
| 4,730,970 | 3/1988 | Hyner et al. | 411/902 |
| 4,756,774 | 7/1988 | Fox | 148/318 |
| 4,802,807 | 2/1989 | Offenburger et al. | 411/387 |
| 4,964,774 | 10/1990 | Lat et al. | 411/446 |

OTHER PUBLICATIONS

"Selecting the Right Fastener Coating", Assembly Engineering, Aug. 1990, No. 8, pp. 21–23.

Primary Examiner—Upendra Roy
Assistant Examiner—Robert R. Koehler
Attorney, Agent, or Firm—Armstrong, Westerman, Hattori, McLeland & Naughton

[57] ABSTRACT

The surface layer of a hard austenitic stainless steel screw is formed as nitrided layer and then is covered by a plating coat or a resin coat to give properties such as shortening the boring time as well as heightening the surface hardness of the screw itself.

1 Claim, 3 Drawing Sheets

HARD AUSTENITIC STAINLESS STEEL SCREW

This application is a continuation of application Ser. No. 08/155,279, filed Nov. 22,1993, now abandoned which in turn is a continuation of application Ser. No. 07/731,067 field Jul. 17, 1991abandoned.

TECHNICAL FIELD

This invention relates to a hard austenitic stainless steel screw of which the surface layer is formed as a hard nitrided layer and then is covered by a plating coat or a resin coat.

PRIOR ART

Generally many kinds of screws are available in the market, for example, as shown in FIGS. 3, 4 and 5, a tapping screw (20), a drilling tapping screw (21) and dry-wall screw (22) for applying a gypsum board, a heat-resisting board or the like to a base material such as a light-weight iron and steel sheet or plate. When using the tapping screw (20), a borehole of which the diameter is smaller than that of the tapping screw is formed in the base material and the tapping screw is threaded therein while when using the drilling tapping screw (21) and the dry-wall screw (22), such a bore is not formed at all, but a drilling part of the screw end or a knife edge itself can bore the base material to screw. This kind of material comprises a cement steel of iron and the like and stainless steel materials conventionally. In particular, among the stainless steel materials, a martensitic stainless steel SUS 410 which does not contain nickel is used so much. Screws of these materials are scarcely used as they are, but ones with various kinds of plating conducted are used. However, even if they are plated, there are some disadvantages in that they are apt to cause rust or that they have low corrosion resistance against acids such as sulfuric acid and nitric acid, and acid rain.

An austenitic stainless steel material, which contains 7% to 19% of Nickel by weight, is used besides the martensitic stainless steel material mentioned above. The surface of this kind of stainless steel becomes a passive coat layer to have high anti-corrosion property, so that it is used as it is without conducting a plating or the like. However, since this kind of austenitic stainless steel has basically small hardness in the surface, there are severe limitations in strength when applying to the various uses mentioned before.

The inventors of the present invention developed a method for making the surface hardness higher by nitriding the surface of the austenitic stainless steel to form a nitrided layer in order to improve the above-mentioned disadvantages. It has been filed as a Japanese Patent Application No. 1-177660. Thus nitrided stainless steel has large surface hardness. However, when the austenitic stainless steel is applied for the above-mentioned uses, it provides drawbacks in that it takes a long time for boring, that the head part of a screw is destroyed and/or the screw head is broken or given way and also that rust is generated on the nitrided layer of the surface.

OBJECT OF THE INVENTION

Accordingly, an object of the invention is to solve the problems such as long boring time by forming a nitrided layer on the surface layer of an austenitic stainless steel screw to provide high surface hardness thereto and by forming a plating coat or resin coat on the nitrided surface layer to give smoothness.

DISCLOSURE OF THE INVENTION

To accomplish the above-mentioned object, the invention provides a hard austenitic stainless steel screw, wherein the surface layer of the austenitic stainless steel screw body is formed as a nitrided layer and the nitrided surface layer is covered by a plating coat or a resin coat.

In other words, the austenitic stainless steel screw according to the present invention has large surface hardness by making the surface layer as a nitrided layer. It performs high strength property when it is applied to various required uses of screws. In addition, it can be realized to shorten the boring time largely with provided smoothness resulting from a plating coat or a resin coat since the surface of the nitrided layer is covered with the plating film or the resin film. The screw according to this invention provides an advantage in that presence of the plating coat or the resin coat prevents rust on the nitrided layer itself thereof. The screw is not thereby rusted even if it is held or placed in an atmosphere containing moisture for a long time. Besides an advantage is provided in that it is possible to give the same gloss as stainless steel when the surface of the nitrided layer is plated.

BRIEF DESCRIPTION OF THE DRAWINGS

A heat treatment furnace used in an example is prepared at first. This furnace 1, as shown in FIG. 1, is a pit furnace comprising an inner vessel 4 surrounded by a heater 3 disposed within an outer shell 2, with a gas inlet pipe 5 and an exhaust pipe 6 being inserted therein. Gas supply is made through the gas inlet pipe 5 from cylinders 15 and 16 via flow meters 17, a valve 18 and so on. The inside atmosphere is stirred by means of a fan 8 driven by a motor 7. Works 10 placed in a metal container 11 are charged into the furnace. In FIG. 1, the reference numeral 13 indicates a vacuum pump and 14 a noxious substance eliminator. A fluorine- or fluoride-containing reaction gas, for example, a mixed gas composed of $NF_3$ and $N_2$, is introduced into this furnace and heated, together with the works, at a specified reaction temperature. At temperatures of 250°–400° C., $NF_3$ evolves fluorine in the nascent state, whereby the organic and inorganic contaminants on the steel work surface are eliminated therefrom and at the same time this fluorine rapidly reacts with the base elements Fe and chromium on the steel work surface and/or with oxides occurring on the steel work surface, such as FeO, $Fe_3O_4$ and $Cr_2O_3$. As a result, a very thin fluorinated layer containing such compounds as $FeF_2$, $FeF_3$, $CrF_2$ and $CrF_4$ in the metal composition is formed on the surface, for example as follows:

$$FeO + 2F \rightarrow FeF_2 + \tfrac{1}{2}O_2$$

$$Cr_2O_3 + 4F \rightarrow 2CrF_2 + 3/2O_2$$

These reactions convert the oxidized layer on the work surface to the fluorinated layer. At the same time, $O_2$ adsorbed on the surface is removed therefrom. Where $O_2$, $H_2$ and $H_2O$ are absent, such fluorinated layer is stable at temperatures up to 600° C. and can presumably prevent oxidized layer formation on the metal bases and adsorptin of $O_2$ thereon until the subsequent step of nitriding. The fluorinated layer is formed not only on the surface of work 10 but also on the furnace material surface, so that the stable fluorinated layer minimizes damage to the furnace material surface because of a protecting action thereof.

The works thus treated with such fluorine- or fluoride-containing reaction gas are then heated at a nitriding temperature of 480° C. to 700° C. Upon addition of $NH_3$ or a mixed gas composed of $NH_3$ and a carbon source gas (e.g. RX gas) in said heated condition, the fluorinated layer is removed by reduction or destruction with $H_2$ or a trace amount of water (prior to introducing the RX gas, a mixed gas composed of $N_2+H_2$ is introduced into the furnace) to give an active metal base to the surface of the work 10.

Upon formation of such active metal base, active N atoms are adsorbed thereon, then enter the metal structure and diffuse therein and, as a result, a compound layer (a nitrided layer) containing nitrides such as CrN, $Fe_2N$, $Fe_3N$ and $Fe_4N$ is formed on the surface. Then a plating coat or a resin coat is formed thereon. As the plating coat, there are various plating coats such as a galvanizing coat, a Nickel Zinc plating coat, a tinning coat. Thickness of the coat is set at 25 μm to 1 μm, preferably 5±3 μm. A coat may be formed by combining one of the above-mentioned various platings with a gloss chromate filming. As the resin coat, there are a fluorine resin coat, vinyl chloride resin coat and a thermoplastic resin coat such as polyolefin resin coat, for example, polyethylene, polypropylene or the like. Thickness of the coat is set at 25 μm to 1 μm, preferably 3±2 μm. Besides, a thermosetting resin coat such as a phenol resin and an epoxy resin is also used. These resin coats are formed, for example, by dipping the screw body into said resin solution or by spraying the resin to the screw and drying by heating.

Using the above-mentioned treatment furnace, a screw body is treated concretely as follows.

EXAMPLE 1

Figure 1:
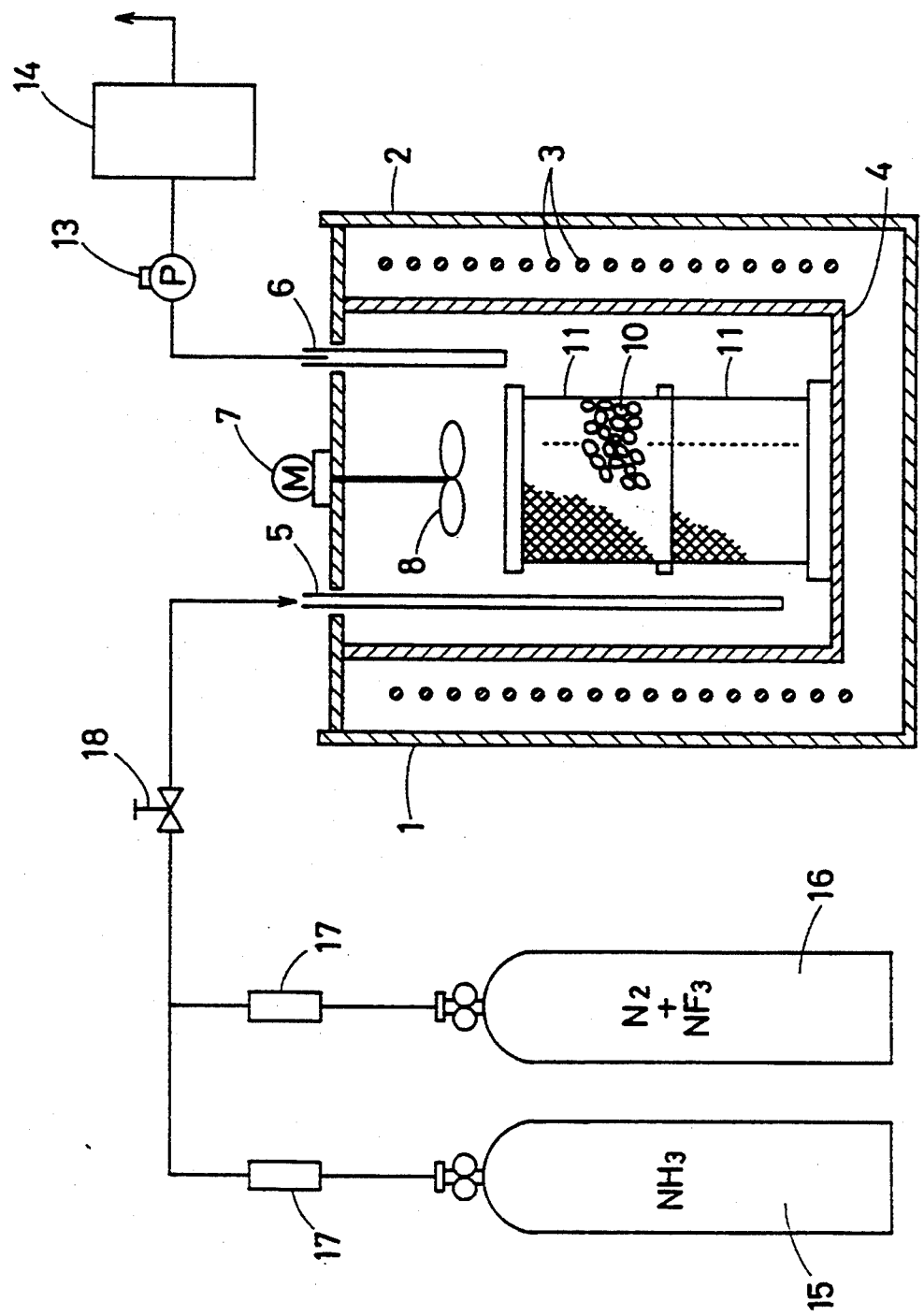
FIG. 1 shows a view of a structure of a heat treatment furnace used in this invention.

Tapping drilling screws made of SUS 305 stainless steel as works were cleaned with trichloroethylene, then charged into a treatment furnace 1 shown in FIG. 1, and held at 300° C. for 15 minutes in an $N_2$ gas atmosphere containing 2% by weight of $NF_3$, then heated at 700° C., and nitriding treatment was carried out to the works at that temperature for 5 hours while a mixed gas composed of 50% $NH_3+50\%$ $N_2$ was introduced into the furnace. The works were then air-cooled and taken out of the furnace.

The nitrided layer of each work thus obtained was uniform in thickness. The surface hardness was 700 to 800 Hv while the base material portion had that of 270 to 290 Hv.

Next, the nitrided samples in the above method were charged into an zinc pot furnace (not shown), a coat of a galvanizing+gloss chromate filming was formed on each sample. In this case, thickness of the coat was set at 5 μm. Then the obtained samples were dipped in a composite coating liquid composed of organic coating liquid containing Si—O—R group and inorganic coating liquid to form a, coating film having thickness of 5 μm.

Figure 2:
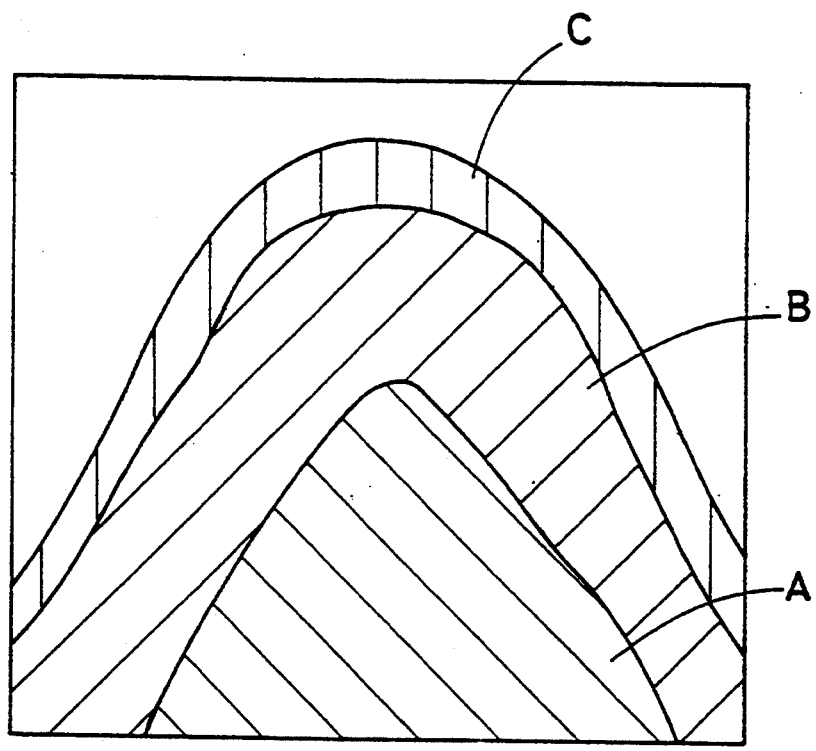
FIG. 2 shows a schematic representation of a cross-sectional electromicroscope photograph (magnification = 500) of a portion of the thread ridge as described in one of the Examples.
Figure 3:
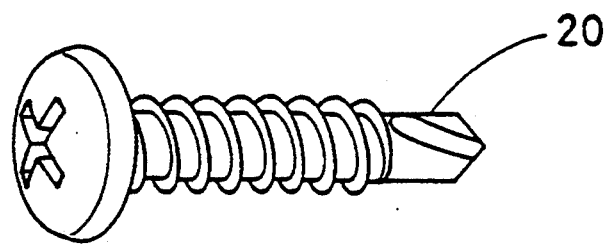
FIGS. 3, 4 and 5 show explanatory views of screws according to the present invention.
Figure 4:
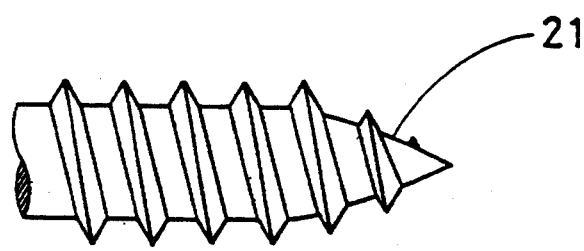
Figure 5:
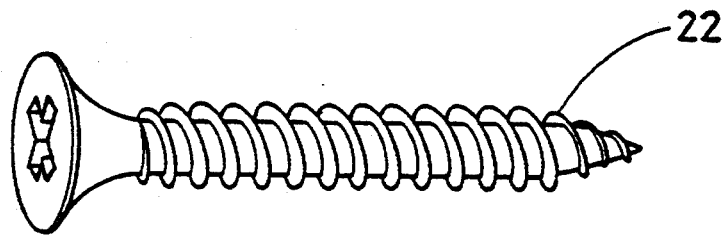

FIG. 2 shows a screw thread of the sample (tapping drilling screw) having deposited multi-layers. The plating coat C was formed on the nitrided layer B. The mark A refers to a metal base.

A screwing test of 2.3′ and 1.6′ against cold roll steel plate SPCC using 10 samples thus obtained was conducted. The same test was conducted using 10 samples of a comparative example in which the samples were only nitrided. The results were shown in Table 1. The screwing test was based on JIS (Japan Industrial Standard).

TABLE 1

| | 1.6′ | 2.3′ |
|---|---|---|
| Comparative example (only nitrided screw) | 10 screws were tightened in 2.5 to 4.5 seconds. | 7 out of 10 were tightened in 4.5 to 6.5 seconds. (Heads of 3 were crashed.) |
| Example according to the present invention | 10 screws were tightened in 1.2 to 1.5 seconds. | 10 screws were tightend in 1.5 to 4.0 seconds |

EXAMPLE 2

In this example, SUS 316 dry wall screws were used instead of the tapping screws used in the Example 1. After nitriding is conducted as well as in the Example 1, the screws were exposed to plating of nickel+zinc and gloss chromate filming and then dipped in composite coating liquid composed of organic coating liquid containing Si—O—R group and inorganic coating liquid. A neutral salt spray test was carried out on thus obtained screws and on comparative example screws which were only nitrided. The results are shown in Table 2.

TABLE 2

| Comparative Example (Screws only nitrided) | Red rust caused after 4 hours |
|---|---|
| Example screws according to the present invention | White rust caused after 480 hours |

The articles obtained according to the present invention were exposed to boiled 5% $H_2SO_4$ test. The fact that depleticn was 8 g/m²h, that is, degree of the depletion was rather low, was proved.

EXAMPLE 3

The same kind of tapping drilling screws as used in the Example 1 were used and a nitrided layer was formed thereon as well as Example 1. A dispersion liquid which is dispersed fine powder of polytetrafluoroethylene (PTFE) in naphtha (concentration: 10% by weight) was prepared. Then the tapping drilling screws with the nitrided layer formed were dipped in the dispersion liquid and volatilized and dispersed the naphtha solvent, then charged into the heat treatment furnace (not shown) and baked at 360° C. to 380° C. to form a resin coat having thickness of 5 μm.

The articles obtained in this example were exposed to a screwing test based on JIS and a neutral salt spray test, wherein the same results as articles in Examples 1 and 2 were obtained.

In the above-mentioned Examples, pretreatment was always done with $NF_3$ gas prior to nitriding, but $BF_3$, $CF_4$, HF, $SF_6$, $F_2$, $C_2F_6$, $WF_6$, $CHF_3$, $SiF_4$ or the like alone or a mixture thereof may be used instead of $NF_3$ and may be used together with $NF_3$. In addition to the above-mentioned gasses, as the fluorine- or fluoride-containing gas, $F_2$ which is formed by cracking compounds which include F such as $BF_3$, $CF_4$, HF, $SF_6$, $C_2F_6$, $WF_6$, $CHF_3$, $SiF_4$ by a thermal-cracking apparatus may be used. When the compound such as $BF_3$ to be cracked is used, a cracker is disposed in front of or in the vicinity of the heating furnace to thermal-crack the compound. Then the cracked and produced $F_2$ is mixed with $N_2$ and the mixture is introduced into the furnace. Fluorine- or fluoride-containing gas used in this invention includes the produced $F_2$ by cracking obtained as the above-mentioned. Said stainless steel material is heated and held at 150° C. to 600° C., preferably 300° C. to 500° C. under such a fluorine- or fluoride-containing atmosphere to pretreat the material surface (The gas concentration: 0.05 to 20%, preferably 2 to 7%, more preferably 3 to 5% by weight), and then the material is nitrided (or carbonitrided) with publicly known nitriding gas, for example, ammonia. However, it is possible to form a nitrided layer directly without pretreating the material with the fluorine- or fluoride-containing gas such as $NF_3$ as the above-described. In the Examples, although the plating coat is formed by a Ni—Zn plating which is an electroplating and a gloss chromate filming, an electroless plating may be conducted instead of the electrolytic Ni—Zn plating. Instead of the gloss chromate filming, it is possible to form a plating coat by Ni—Zn plating, Zn-plating, tinning or electroless Ni-plating only. For a method of plating, various methods such as an electroplating, a hot dipping and an electroless plating are utilized widely. As the resin coat, not only a single layer but also composite or multi-layers in which two kinds of resin coats are deposited may be formed. As the resin used for forming the coat, not only homopolymer but also copolymer of previously shown resins are possibly used.

EFFECTS OF THE INVENTION

As mentioned above, in the austenitic stainless steel screw according to the present invention, the surface layer thereof is formed as a nitrided layer, the surface hardness is thereby extremely high to be preferable and adequate upon screwing or the like. In particular, the surface layer is covered by a plating coat, which allows to realize a remarkable improvement in the screwing property by an action of the smoothness from the plating coat. Furthermore, the nitrided layer which is easily rusted is shut off from outside air to thereby prevent rust when the stainless steel work is kept or placed for a long time in a moisturized atmosphere. In addition, since gloss is given to the work by the plating, appearance of the screw looks like a stainless steel material.

What we claim is:

1. A hard austenitic stainless steel screw comprising a stainless steel screw, a nitrided layer on the entire surface of the stainless steel screw, and a fluorine resin coat on the nitrided layer, said fluorine resin coat having a thickness of from 1 $\mu$m to 25 $\mu$m.

* * * * *